United States Patent

Miyata et al.

[11] Patent Number: 5,836,813
[45] Date of Patent: Nov. 17, 1998

[54] AIR CONDITIONER FOR VEHICLE

[75] Inventors: Manabu Miyata, Obu; Yuichi Shirota; Hisashi Tanaka, both of Anjo; Koji Ito; Hikaru Sugi, both of Nagoya, all of Japan

[73] Assignee: Denso Corporation, Kariya, Japan

[21] Appl. No.: 760,677

[22] Filed: Dec. 4, 1996

[30] Foreign Application Priority Data

Dec. 5, 1995 [JP] Japan .................................. 07-316915

[51] Int. Cl.⁶ .................................................. B60H 1/26
[52] U.S. Cl. ........................ 454/139; 181/225; 454/158; 454/906
[58] Field of Search ............................ 454/69, 139, 158, 454/906; 181/225, 226

[56] References Cited

U.S. PATENT DOCUMENTS 5,391,112  2/1995  Wardlaw ................................. 454/139

OTHER PUBLICATIONS

Journal of Nippondenso Technical Disclosure 33–027, published Jan. 15, 1984.

*Primary Examiner*—Harold Joyce
*Attorney, Agent, or Firm*—Harness, Dickey & Pierce, PLC

[57] ABSTRACT

An inside air/outside air switching case employing a rotary door, since an introduced air flows along an inner surface of a circumferential wall of the rotary door, an air flow guiding portion constructed of a plurality of protruding portions formed in a corrugated shape of concavities and convexities is formed on an inner surface of the circumferential wall of the rotary door. In this way, the air flow directed toward a suction inlet is made uniform by means of the guiding portion, and the air flow noise can be suppressed.

8 Claims, 6 Drawing Sheets

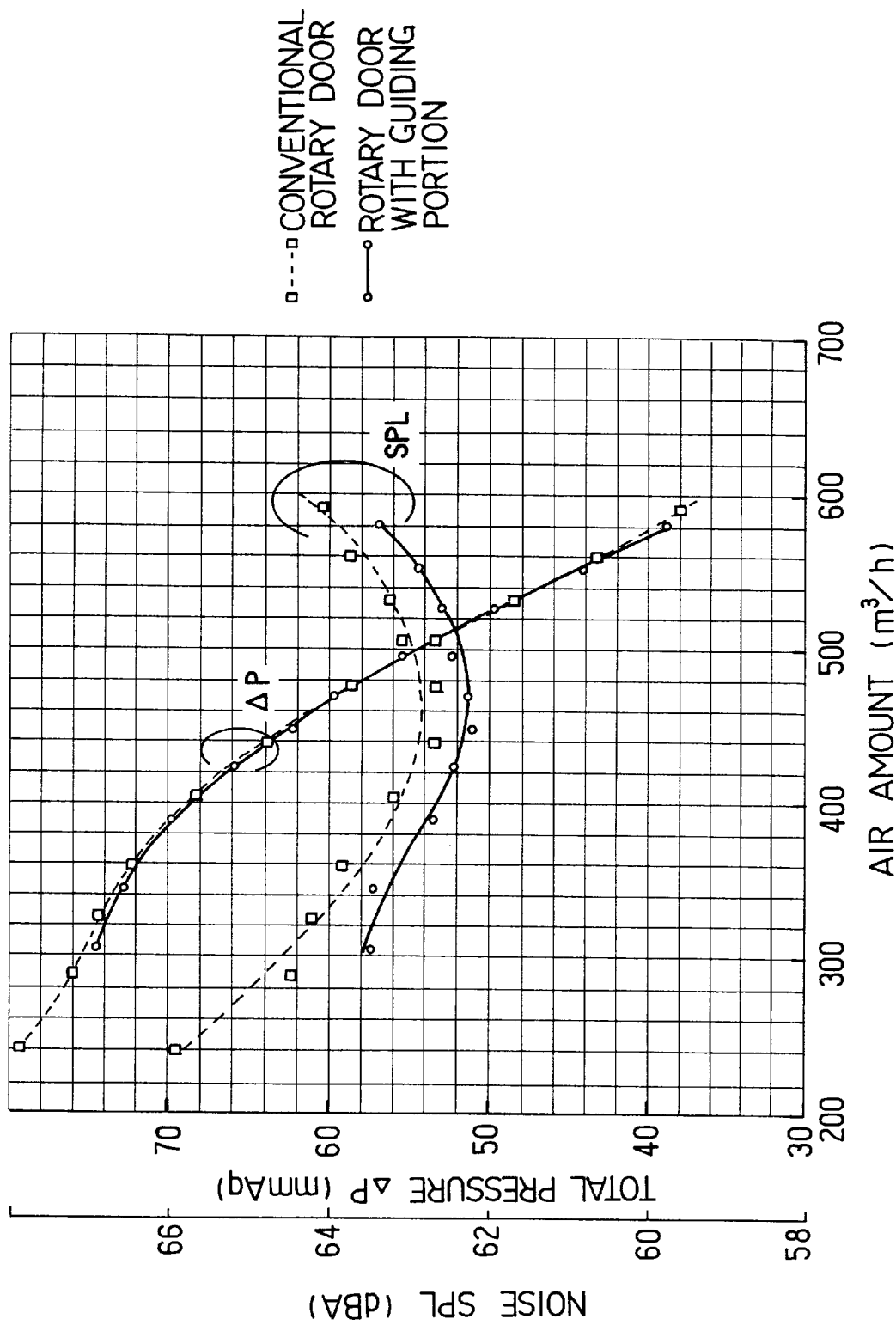

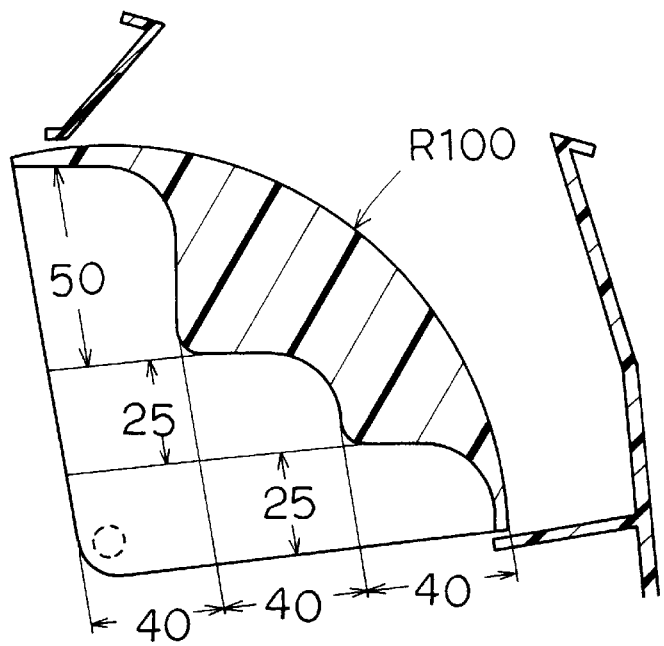
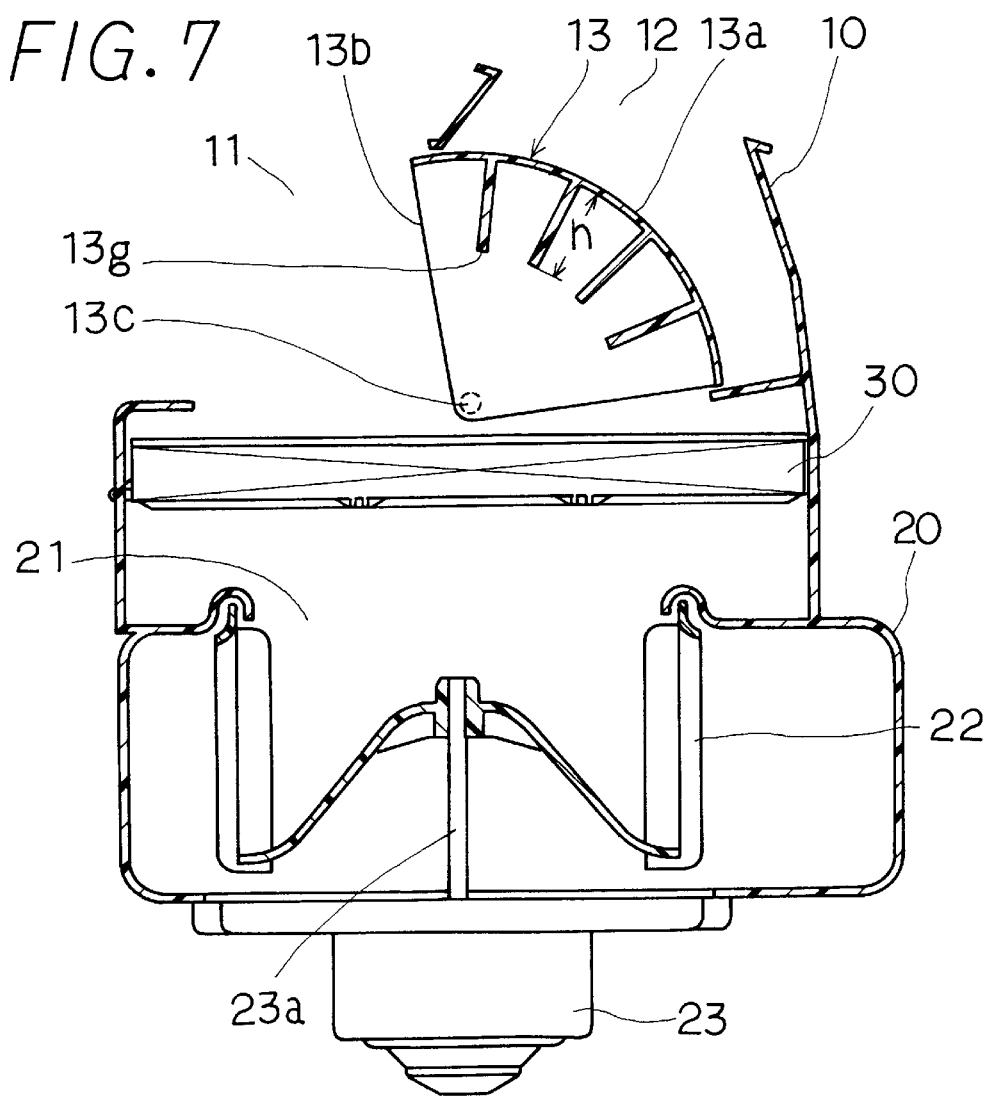

AIR CONDITIONER FOR VEHICLE

BACKGROUND OF THE INVENTION

1. Field of the Invention

The present invention relates to an inside air/outside air switching case in an air conditioner for a vehicle, for switching and introducing an outside air (air outside the passenger compartment) and an inside air (air within the passenger compartment).

2. Description of Related Art

Conventionally, an inside air/outside air switching case in an air conditioner for a vehicle, for switching and introducing an outside air and an inside air, there has been employed a rotary door having an arc-shaped circumferential wall as switching and introducing means, which opens and closes an inside air introduction inlet and an outside air introduction inlet by means of the circumferential wall of this rotary door.

In the inside air/outside air switching case employing the rotary door, there is an advantage that the door installation space can be reduced as compared with the type employing an ordinary flat plate door. Also, in the case of the flat plate door, since the travelling wind pressure (ram pressure) generated by the high speed travelling of a vehicle is applied to the rotating direction of the door, the outside air may leak and enter in the inside air introduction mode. In contrast to this, in the case of the rotary door, since thee travelling wind pressure (ram pressure) is applied perpendicularly to the rotating direction of the door, there is another advantage that the outside air hardly leak and enter.

However, on the other hand, according to the present inventors' experiments and researches, it turns out that in the inside air/outside air switching case employing a rotary door there arises a problem that the air flow noise increases for the following two reasons.

That is, firstly, by the introduced air flowing from one end to the other end of the circumferential wall of the rotary door along the inner surface thereof, a main flow of air is biased to the side of the other end of the circumferential wall of the rotary door. As a result, the flow of the air directed toward a suction inlet of a fan disposed immediately after the inside air/outside air switching case is also biased, and there causes a phenomenon in which the turbulence of the air within the inside air/outside air switching case increases and the noise increases.

Particularly, in the inside air mode, since the inside air introduction inlet is open directly to the interior of the passenger compartment, there has been a problem that the air flow noise released into the passenger compartment increases due to the biased air flow.

Also, when filter member for filtering the dust and deodorizing the offensive odor is disposed between a downstream side immediately downstream the rotary door and the suction inlet of the fan, the turbulence due to the biased air flow is facilitated, and the above-mentioned problem becomes more remarkable.

Further, secondly, since the inner surface of the circumferential wall of the rotary door is arc-shaped, there occurs a phenomenon that the noise generated at the suction inlet of the fan is echoed, amplified, increased by the inner surface of the circumferential wall. Also, in this case, in the inside air mode, the amplified noise is released inconveniently from the inside air introduction inlet directly to the interior of the passenger compartment, and the noise level becomes more remarkable.

SUMMARY OF THE INVENTION

In view of the above-mentioned problems, an object of the present invention is to decrease the air flow noise in an air conditioner for a vehicle, which is equipped with an inside air/outside air switching case employing a rotary door.

In the present invention, firstly, considering that in the inside air/outside air switching case employing a rotary door the introduced air flows along the inner surface of the circumferential wall of the rotary door so that the air flow is biased and as a result the air blow noise is caused, technical means for eliminating the biased air flow along the circumferential wall of the rotary door is adopted to achieve the above object.

That is, according to an aspect of the present invention, in an inside air/outside air switching case employing a rotary door, a air flow guiding portion protruding from an inner surface of the circumferential wall of the rotary door toward a rotary shaft side is formed, and the flow of the air directed to the suction inlet of the air flow casing is made to be uniform by means of the guiding portion.

In this way, in the inside air introduction mode, when the main flow of the introduced inside air passes along the inner surface of the circumferential wall of the rotary door, the flow of the introduced inside air can be deflected by the air flow guiding portion toward the center of the suction inlet compulsorily.

As a result, the air is distributed with a substantially uniform wind velocity over the entire surface of the suction inlet, the flow of the air on the upstream air side of the suction inlet is smoothed, and the turbulence of the flow of the air is made smaller. Therefore, the noise due to the turbulence of the flow of the air is reduced.

The air flow guiding portion may be constructed of a plurality of protrusions formed in the corrugated shape of concavities and convexities. Further, when the rotary door is positioned in an inside air introduction mode, a height of one of the plurality of protruding portions, which is located on the side of the inside air introduction inlet may be larger than that of one of the plurality of protruding portions, which is located away from the inside air introduction inlet.

By decreasing more the height of each of the plurality of protrusions as the location thereof changes from the side closer to the inside air introduction inlet toward the side farther therefrom, the deflection of the flow of the introduced inside air can be made more equally.

Also, in the present invention, secondly, considering that the inner surface of the circumferential wall of the rotary door is arc-shaped and the noise generated at the suction inlet of fan is echoed and amplified by the inner surface of the circumferential wall, technical means for effectively decreasing the noise amplified by the inner wall of this circumferential wall is adopted.

That is, according to another aspect of the present invention, in an inside air/outside air switching case employing a rotary door, a reflection plate protruding from the inner wall of the circumferential wall of the rotary door toward the rotary shaft side is formed to reflect the noise irregularly.

When the inner surface of the circumferential wall of the rotary door is formed in a simple arc shape, the noise generated at the suction inlet of the air flow casing is echoed and amplified by the inner surface of the circumferential wall, however, in the present invention, the noise can be reflected irregularly by the reflection plate, the noise generated at the suction inlet of the air flow casing is reflected irregularly by the reflection plate and attenuated and a part thereof is reflected toward the suction inlet side.

As a result, it is possible to decrease the level of the noise released from the inside air introduction inlet into, the passenger compartment in the inside air introduction mode.

BRIEF DESCRIPTION OF THE ACCOMPANYING DRAWINGS

Additional objects and advantages of the present invention will be more readily apparent from the following detailed description of preferred embodiments thereof when taken together with the accompanying drawings in which:

FIG. 5 is a graph illustrating a relationship between the noise SPL and total pressure ΔP and the air amount in each of the first embodiment of the present invention and a conventional system;

FIG. 6 is a cross sectional view illustrating detailed dimensions of a main portion of a rotary door used in an experimental example of FIG. 5;

FIG. 7 is a cross sectional view illustrating a main portion of a second embodiment of the present invention.

DETAILED DESCRIPTION OF THE PREFERRED EMBODIMENTS

Figure 1:
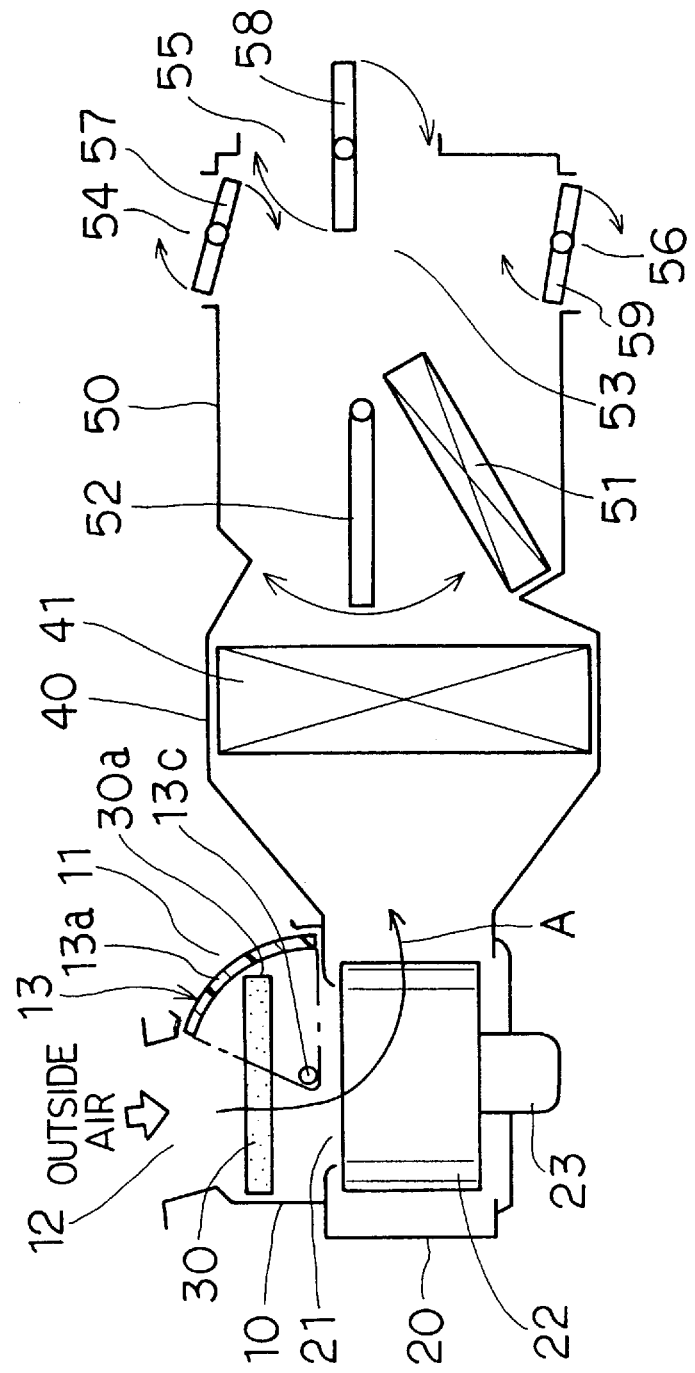
FIG. 1 is a sectional view illustrating a ventilation system of an air conditioner for a vehicle according to a first embodiment of the present invention.

The present invention will now be described with reference to embodiments illustrated in the drawings.

A first embodiment of the present invention will be described with reference to FIGS. 1 to 4. FIG. 1 illustrates an overall construction of a ventilation system of an air conditioner for a vehicle. The system illustrated in FIG. 1 is generally disposed below a dashboard at a front portion of the interior of a passenger compartment of an automotive vehicle. An inside air/outside air switching case 10 is made of synthetic resin, and an air blow scroll casing 20 is disposed adjacently below the inside air/outside air switching case 10. The interior of the inside air/outside air switching case 10 is communicated with a bell-mouth shaped suction inlet 21 of the scroll casing 20.

Also, the inside air/outside air switching case 10 has an inside air introduction inlet 11 for introducing inside air within the passenger compartment and an outside air introduction inlet 12 for introducing air outside the passenger compartment. The inside air introduction inlet 11 communicates with a glove box (not illustrated) in the dashboard. Within the inside air/outside air switching case 10, an inside air/outside air switching rotary door 13 is rotatably disposed. Each of opening surfaces of the inside air/outside air introduction inlets 11 and 12 is formed in an arc-shaped surface along the arc-shaped circumferential wall 13a of the inside air/outside air switching rotary door 13 so that the circumferential wall 13a is adopted to contact with the opening surfaces while being rotated.

Figure 2:
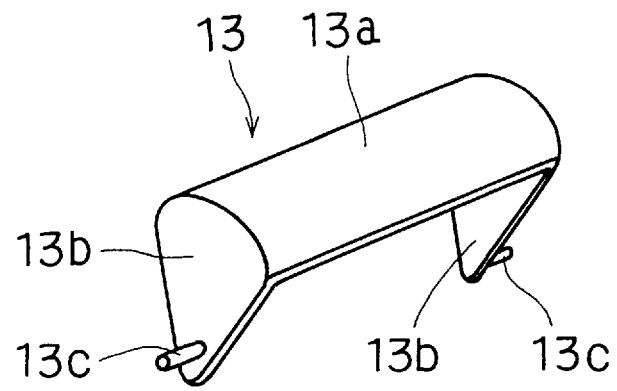
FIG. 2 is a perspective view illustrating a rotary door illustrated in FIG. 1.

Here, as illustrated in FIG. 2, in the rotary door 13, the arc-shaped circumferential wall 13a is so formed as to connect outer-peripheral ends of two fan-shaped side plates 13b. A rotary shaft 13c is provided axially outwardly at the position of an angular corner portion of each fan-shaped side plate 13b (the center position of the curvature radius of the circumferential wall 13a). The rotary door 13 is rotatably supported in the case 10 with the rotary shaft 13c as its center. The rotary door 13 may be manufactured easily, for example, may be integrally molded with the resin.

Figure 3:
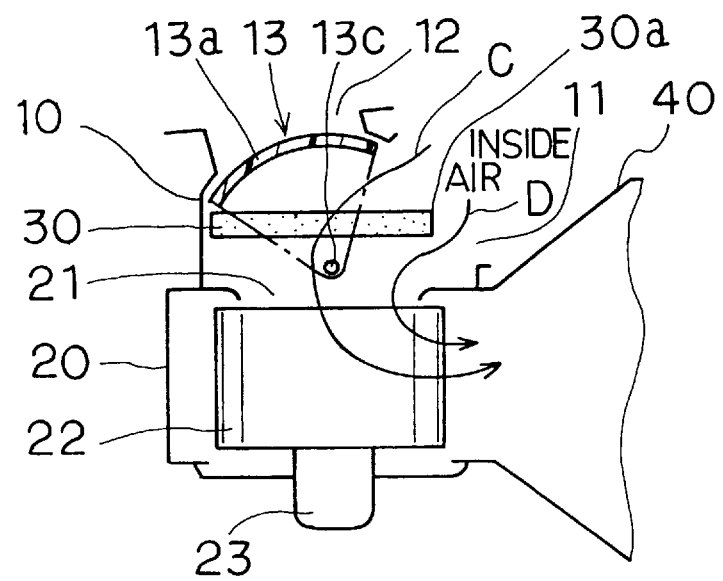
FIG. 3 is a cross sectional view illustrating a main portion of the system of FIG. 1 in an inside air introduction mode.

FIG. 1 illustrates a state where the outside air introduction is selected by the rotary door 13 and FIG. 3 illustrates a state where the inside air introduction is selected by the rotary door 13. As a mechanism for rotating the rotary door 13, the manual operation force of an inside air/outside air switching operation member (e.g., a manual operation lever) provided on an air conditioning control panel (not illustrated) may be transmitted to the rotary shafts 13c through, for example, cables to rotate the rotary door 13, or otherwise, an electric switch (not illustrated) may be operated by the inside air/outside air switching operation member of the air conditioning control panel to actuate an electric actuator (motor or the like), and the rotary door 13 is rotated by the electric actuator.

An air filter 30 is constructed in such a manner that a filtering material made of corrugated Japanese paper, porous urethane foam or the like is supported with a resin frame member. Here, the entire configuration of the air filter 30 is a flat plate illustrated in FIG. 1. The air filter 30 removes the dust in the air, and if necessary, a deodorizing function may be performed, by adding an adsorbent for adsorbing malodorous components such as active carbon to the filtering material.

Also, the air filter 30 is disposed inside the inside air/outside air switching case 10 at a position between the downstream air side of the inside air introduction inlet 11 and outside air introduction inlet 12 and the suction inlet 21. In the arrangement illustrated in FIGS. 1 and 3, particularly, the air filter 30 is disposed at an intermediate position between the circumferential wall 13a and the rotary shaft 13c of the rotary door 13 in as manner as not to obstruct the rotating operation of the rotary door 13. By adopting such an arrangement, it is possible to avoid an increase in the installation space due to the installation of the air filter 30.

The scroll casing 20 is made of resin. Within the scroll casing 20, an air blowing fan 22 consisting of a centrifugal multi-blade fan (sirocco fan) is disposed at a central position of the scroll configuration. By the rotation of this fan 22, the air having been taken in from the suction inlet 21 flows outwardly in a radial direction of the fan 22 as indicated by an arrow A. The air blowing fan 22 is connected to and rotated by a rotary shaft 23a of a driving motor 23 (refer to FIG. 4).

In FIG. 1, a cooling unit 40 is connected to an air outlet side of the scroll casing 20, and within the cooling unit 40, there is disposed an evaporator 41 of the refrigeration cycle driven by the automobile engine as the driving source. The blown air is cooled and dehumidified by the evaporator 41.

A heating unit 50 is connected to the downstream air side of the cooling unit 40 and is equipped with a heater core 51 which heats the blown air by using an engine cooling water (hot water) as the heat source. An air mix door 52 is disposed adjacent to the heater core 51 and adjusts the ratio of air amounts between the warm air passing through and heated by the heater core 51 and the cool air bypassing the heater core 51 and the cold air that has bypassed the heater core 51, thus serving as temperature adjusting means for adjusting the temperature of the blown-out air.

On a downstream air side of the heater core 51, there is formed a mixing chamber for mixing the warm air and the cool air, and the air mixed in the mixing chamber and having a desired temperature is blown out into the passenger compartment through a well known defroster air outlet 54, face air outlet 55 and foot air outlet 56. These air outlets 54 to 56 are opened or closed by outlet mode doors 57 to 59, respectively.

Figure 4:
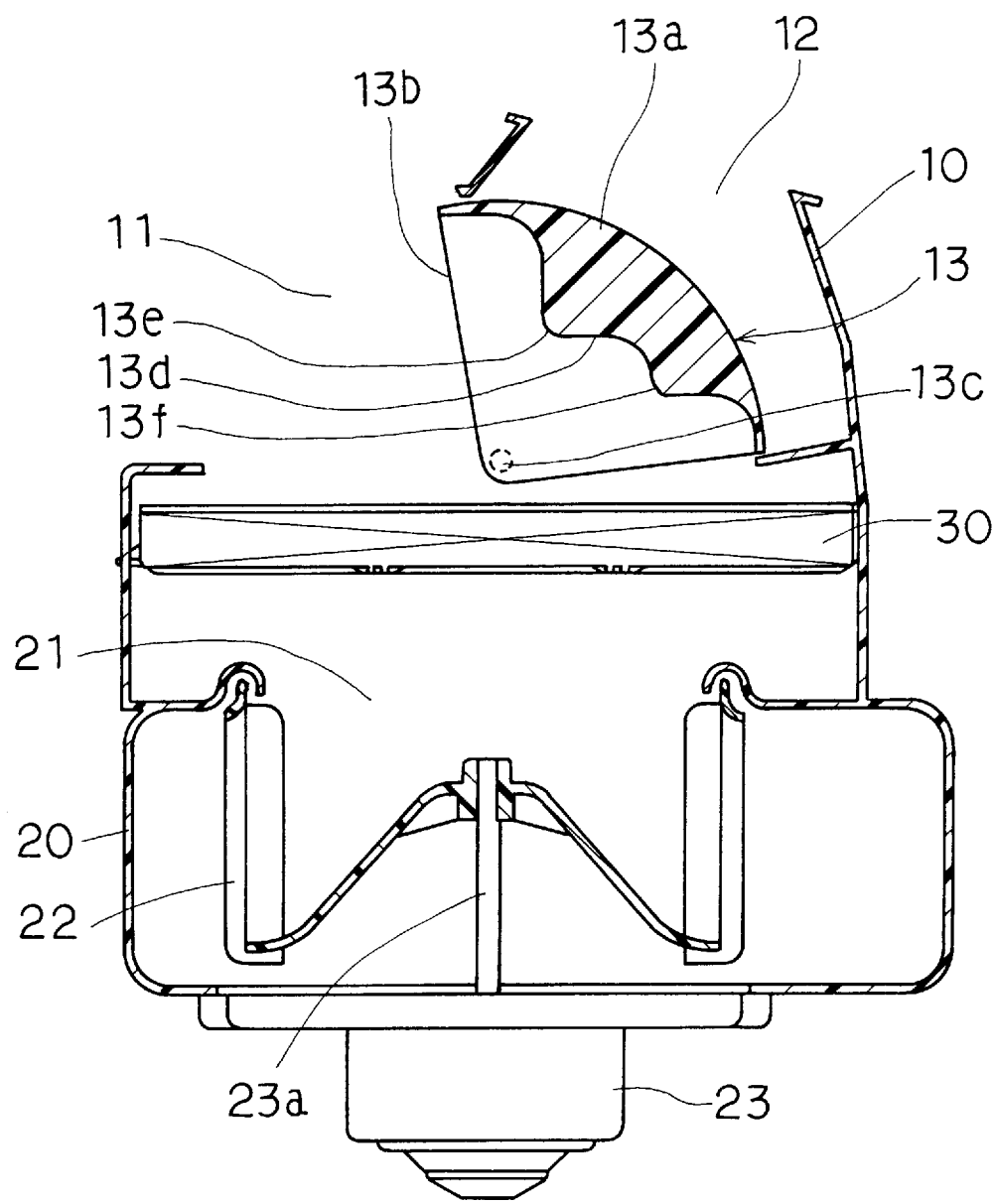
FIG. 4 is a cross sectional view illustrating a main portion of the first embodiment of the present invention.

FIG. 4 illustrates a main portion of the first embodiment of the present invention and is an enlarged view illustrating the inside air/outside air switching case 10 portion and the air blow casing 20 portion in FIG. 1. However, this figure is slightly modified from FIG. 1. That is, in an example of FIG. 4, the air filter 30 is disposed at a position that is lower than the position of the rotary shaft 13c of the rotary door 13. In other words, it slightly differs from FIG. 1 in that the air filter 30 is disposed at an intermediate position between the rotary shaft 13c of the rotary door 13 and the suction inlet 21 of the fan. In this way, the arrangement of the air filter 30 may be variously modified.

A configuration according to the present invention is specially formed on the inner surface of the circumferential wall 13a of the rotary door 13. That is, an air flow guiding portion 13d protruding toward the rotary shaft 13c side is formed on the inner surface of the circumferential wall 13a of the rotary door 13. The air flow guiding portion 13d guides the flow of the air having been introduced from the inside air introduction inlet 11 or outside air introduction inlet 12 toward the suction inlet 21 so that the air flow is made uniform. It is constructed that a plurality of (two pieces in the case of FIG. 4) protruding portions 13e and 13f are formed in a corrugated shape of concavities and convexities on the inner surface of the circumferential wall 13a. Each of these protruding portions 13e and 13f is in the form of extending continuously in the axial direction of the rotary door 13 so as to connect between the right and left side plates 13b and 13b, and is integrally connected to the circumferential wall 13a and side plates 13b, 13b by molding.

Here, the protruding height of each of the plurality of protruding portions 13e and 13f for constituting the air flow guiding portion 13d is set to be as follows. That is, when the rotary door 13 is operated to the position of the inside air introduction mode illustrated in FIG. 4, the height of the protruding portion 13e which is close to the inside air introduction inlet 11 is made to be larger and the height of the protruding portion 13f which is away from the inside air introduction inlet 11 is made to be smaller.

Next, in the above-mentioned construction, an operation of the first embodiment will be described. The inside air introduction and the outside air introduction can be switched by the rotation of the rotary door 13 with the rotary shaft 13c as the center. When the outside air introduction mode is selected, the rotary door 13 is rotated to the position illustrated in FIG. 1. As a result, since the circumferential wall 13a of the rotary door 13 closes the inside air introduction inlet 11 and opens the outside air introduction inlet 12, outside air is introduced from the outside air introduction inlet 12 by means of the rotation of the air blowing fan 22.

Subsequently, all of the introduced outside air passes through the air filter 30, and fine dust, malodorous components and the like are removed and adsorbed by means of the air filter 30. Then, the introduced outside air is sucked from the suction inlet 21 into the air blow scroll casing 20 and passes through the cooling unit 40 and heating unit 50. After the temperature of air is adjusted to a desired temperature, the air is blown out through any one, or a plurality of ones, of the air outlet 54, 55 and 56 into the passenger compartment, whereby the passenger compartment is air conditioned.

Next, when the inside air introduction mode is selected, the rotary door 13 is rotated to the position illustrated in FIGS. 3 and 4. As a result, since the circumferential wall 13a of the rotary door 13 closes the outside air introduction inlet 12 and opens the inside air introduction inlet 11, the inside air is introduced from the inside air introduction inlet 11 by means of the rotation of the air blowing fan 22.

At this time, according to the arrangement layout of FIGS. 1 and 3, the flow C of the inside air passing through the air filter 30 and the flow D of the inside air bypassing the air filter 30 are formed, however, in the arrangement example of FIG. 4, there provided a layout in which all amount of the inside air passes through the air filter 30 in the inside air introduction mode to purify the inside air.

In the inside air introduction mode, in the case where the inner surface of the circumferential wall 13a of the rotary door 13 is in the form of a simple arc-shape having no air flow guiding portion 13d which protrudes therefrom, the main flow of the introduced inside air passes along the arc-shaped inner surface of the circumferential wall 13a while being biased toward the right side portion of FIG. 4. However, in the first embodiment, since the air flow guiding portion 13d is formed on the inner surface of the circumferential wall 13a of the rotary door 13 in such a manner as to protrude therefrom, when the introduced inside air flows along the inner surface of the circumferential wall 13a, it is possible to deflect the flow of the introduced inside air compulsorily from the central side of the air filter 30 and suction inlet 21 toward the left side of FIG. 4 by means of the air flow guiding portion 13d.

Particularly, at the position of the air flow guiding portion 13d in the inside air introduction mode illustrated in FIG. 4, since the protruding height of the plurality of protruding portions 13e and 13f for constituting the air flow guiding portion 13d is set such that the height of the protruding portion 13e located on a side close to the inside air introduction inlet 11 is made to be larger and the height of the protruding portion 13f located on a side away from the inside air introduction inlet 11 is made to be smaller, the introduced inside air can be deflected sufficiently also toward the left side of FIG. 4 of the air filter 30 and suction inlet 21 by the large-height protruding portion 13e on the side close to the inside air introduction inlet 11.

As a result, the air is distributed with a substantially uniform level of wind velocity over an entire surface of the air filter 30, the flow of the air on the upstream side of the air filter 30 is smoothed, and the turbulence of the air flow becomes lessened to a minute amount. In this way, it is possible to decrease the noise due to the turbulence of the air flow.

FIG. 5 is a graph in which the noise SPL (dBA) and the total pressure $\Delta P$ (mm Aq) of the blown air of the air blowing fan 22 are plotted on the ordinate axis and the wind amount ($m^3$/h) of the air blowing fan 22 is plotted on the abscissa axis. The experimental conditions are as follows.

The air blowing fan 22 is a $\phi$ 158 scirocco fan, and the inside air/outside air switching case 10 is in inside air introduction mode and is equipped therein with the air filter 30. The dimensions of the rotary door 13 formed with the air flow guiding portion 13d are as shown in FIG. 6, and the unit of each dimension is millimeter (mm). Here, R 100 represents the curvature radius=100 of the outer-peripheral surface of the circumferential wall 13a. The experiments were performed in such a manner that, in a state where the air blower was disposed alone, the air blowing fan 22 was rotated, and a microphone was installed at a position distant 1m from the inside air introduction inlet 11, the noise was measured.

In FIG. 5, the mark "○" represents the characteristic of the first embodiment which adopts the rotary door 13 having the air flow guiding portion 13d of the above-mentioned dimensions and the mark "□" represents the characteristic of the comparison sample which adopts the conventional rotary door 13 of the same dimensions without having the air flow guiding portion 13d. As can be understood from the comparison between the both characteristics in FIG. 5, according to the first embodiment, it has been confirmed that there was obtained a noise reduction effect of from 0.6 to 0.8 dBA in a wide range of air amount of from 300 to 600 m³/h.

A second embodiment of the present invention will be described with reference to FIG. 7. In the second embodiment, a reflection plate 13g for irregularly reflecting the noise, instead of the air flow guiding portion 13d, is provided on the inner surface of the circumferential wall 13a of the rotary door 13.

This reflection plate 13g is provided in such a manner as to protrude from the inner surface of the circumferential wall 13a of the rotary door 13 toward the rotary shaft 13c side and reflects the noise irregularly. This reflection plate 13g is constructed of a plurality of (4 sheets in the case of this embodiment) flat plate members which are circumferentially disposed at predetermined space intervals on the inner surface of the circumferential wall 13a of the rotary door 13. This flat plate member is in the form of extending continuously in the axial direction of the rotary door 13 so as to connect the right and left side plates 13b and 13b and is integrally connected to the circumferential wall 13a and side plates 13b by molding.

Also, the reflection plate 13g consisting of the plurality of flat plate members is formed so as to be positioned on the radial lines directing toward the rotary shaft 13c.

If no reflection plate 13g is provided on the inner surface of the circumferential wall 13a of the rotary door 13, since the inner surface of the circumferential wall 13a is arc-shaped, the noise generated at the suction inlet 21 of the fan 22 is echoed and amplified by the inner surface of the circumferential wall 13a, and such amplified noise is released from the inside air introduction inlet 11 directly into the passenger compartment.

However, in the second embodiment, on the inner surface of the circumferential wall 13a of the rotary door 13 there is formed the reflection plate 13g which projects toward the rotary shaft 13c side, and therefore, the noise is reflected irregularly by the reflection plate 13g. As a result, the noise generated at the suction inlet 21 of the fan 22 is reflected irregularly by the reflection plate 13g and is attenuated, and in addition, a part thereof is reflected toward the side of the air filter 30 and suction inlet 21.

As a result, in the inside air introduction mode, it is possible to decrease the level of the noise released from the inside air introduction inlet 12 into the passenger compartment.

Figure 8:
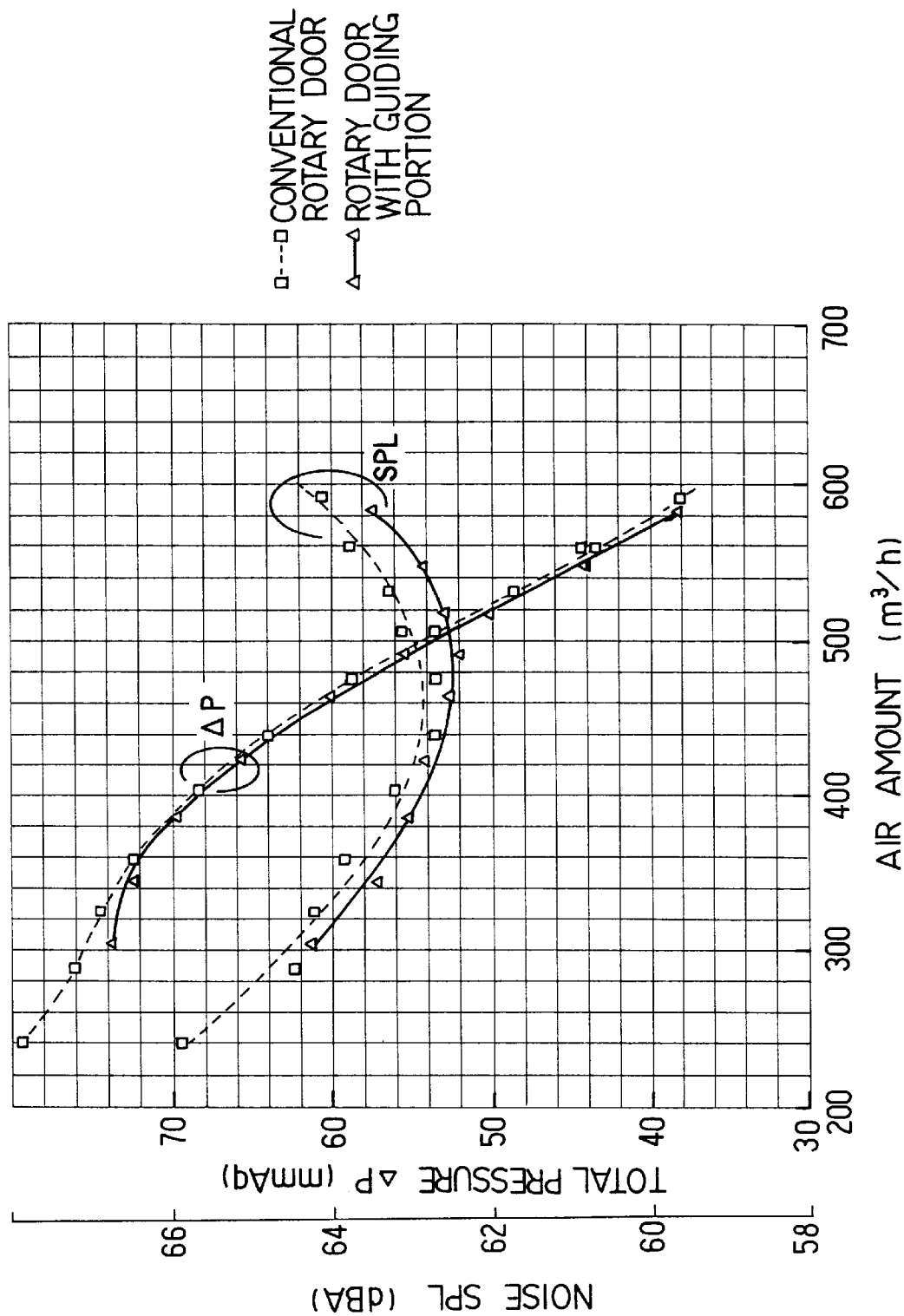
FIG. 8 is a graph illustrating a relationship between the noise SPL and total pressure AP and the wind amount in each of the second embodiment of the present invention and a conventional system.

FIG. 8 is a graph that is similar to that of the above-mentioned FIG. 5. The mark "△" represents the characteristic of the rotary door 13 equipped with the reflection plate 13g and the mark "□" represents the characteristic of the conventional rotary door 13 provided without the reflection plate 13g. The dimension of the rotary door 13 equipped with the reflection plate 13g is set such that, in the rotary door 13 the outer-peripheral surface of whose circumferential wall 13a has a curvature radius being 100 mm, three reflection plates 13g each having a protruding height h being 30 mm are provided at equal space intervals on the inner surface of the circumferential wall 13a. The experimental conditions are the same as those in the case of FIG. 5.

As can be understood from the comparison between the both characteristics of FIG. 8, according to the second embodiment, it has been confirmed that there was obtained a noise reduction effect of from 0.2 to 0.6 dBA in a wide range of air amount of from 300 to 600 m³/h, and particularly, at the air amount of 550 m³/h, there could be achieved a noise reduction of 0.6 dBA.

Additionally, although, in each of the first and the second embodiment, the air filter 30 is disposed on the upstream side of the suction inlet 21 of the fan, the present invention can be similarly applied also to an air conditioner provided without such air filter 30.

Further, since in the first embodiment the portion of the circumferential wall 13a of the rotary door 13, where the air flow guiding portion 13d is formed, is thick in its wall thickness as illustrated in FIG. 4, such a thick wall portion may be formed as a hollow body to lighten the weight of the rotary door 13.

Still further, the air flow guiding portion 13d and reflection plate 13g may not be integrally formed with the circumferential wall 13a of the rotary door 13 by molding, that is, the air flow guiding portion 13d and reflection plate 13g which have been separately formed may be secured to the circumferential wall 13a of the rotary door 13 by means of an adhesion or the like.

Also, in the first embodiment, the noise reduction effect may be enhanced by using a porous sound absorbing material of an urethane foam type or the like as the material for the air flow guiding portion 13d of the rotary door 13.

Similarly, the effect of reducing the noise may be enhanced by, in the second embodiment, using a porous sound absorbing material of an urethane foam type or the like as the material as the material for the reflection plate 13g.

Further, the effect of reducing the noise may be enhanced by, in the second embodiment, adhering a porous sound absorbing material of an urethane foam type or the like to the portion having no reflection plate 13g (the inner surface of the circumferential wall 13a, inside surfaces of the side plates 13b, etc.) of the rotary door 13.

Also, in each of the first and the second embodiment, the air flow guiding portion 13d and reflection plate 13g may not be continuously formed in the axial direction of the rotary door 13, and may be respectively divided plurally at suitable positions in the axial direction of the rotary door 13.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioner for a vehicle having a passenger compartment, comprising:

an air flow casing having a suction inlet and forming an air passage for introducing air sucked from said suction inlet toward said passenger compartment;

an air blowing fan disposed in said casing on a downstream air side of said suction inlet;

an inside air/outside air switching case disposed adjacently on an upstream air side of said suction inlet in communication with said suction inlet, said inside air/outside air switching case having an inside air introduction inlet for introducing air inside said passenger compartment thereinto and an outside air introduction inlet for introducing air outside said passenger compartment thereinto;

a rotary door rotatably disposed within said inside air/outside air switching case with a rotary shaft as its center, said rotary door having an arc-shaped circumferential wall for opening or closing said inside air introduction inlet and said outside air introduction inlet; and an air flow guiding portion protruding from an inner surface of said circumferential wall of said rotary door for guiding air flow directed toward said suction inlet uniformly, said air flow guiding portion including a plurality of protruding portions formed in a corrugated shape of concavities and convexities.

2. An air conditioner as set forth in claim 1, wherein, when said rotary door is positioned in an inside air introduction mode, a height of one of said plurality of protruding portions, which is located on the side of said inside air introduction inlet is larger than that of one of said plurality of protruding portions, which is located away from said inside air introduction inlet.

3. An air conditioner s set forth in claim 1, wherein said air flow guiding portion is integrally formed with said circumferential wall of said rotary door by molding.

4. An air conditioner as set forth in claim 1, further comprising:

an air filter disposed at a position between said rotary door and said suction inlet within said inside air/outside air switching case.

5. An air conditioner for a vehicle having a passenger compartment, said air conditioner comprising:

a casing having a suction inlet and forming an air passage for introducing air sucked from said suction inlet toward said passenger compartment;

an air blowing fan disposed in said casing on a downstream air side of said suction inlet;

an inside air/outside air switching case disposed adjacently on an upstream air side of said suction inlet in communication with said suction inlet, said inside air/outside air switching case having an inside air introduction inlet for introducing air inside said passenger compartment thereinto and an outside air introduction inlet for introducing air outside said passenger compartment thereinto;

a rotary door rotatably disposed within said inside air/outside air switching case with a rotary shaft as its center, said rotary door having an arc-shaped circumferential wall for opening or closing said inside air introduction inlet and said outside air introduction inlet and a pair of end walls disposed at opposite ends of said circumferential wall;

a reflection member disposed between said pair of end walls of said rotary door, said reflection member protruding from an inner surface of said circumferential wall of said rotary door for reflecting a noise irregularly, said reflection member including at least one flat plate disposed at a predetermined interval between said pair of end walls on said circumferential wall of said rotary door to form an open space between one of said pair of end walls and said at least one flat plate.

6. An air conditioner as set forth in claim 5, wherein said at least one flat plate includes a plurality of flat plates disposed at predetermined space intervals between said pair of end walls on said circumferential wall of said rotary door, said plurality of flat plates being located on radial lines extending toward said rotary shaft.

7. An air conditioner as set forth in claim 5, wherein said reflection member is integrally formed with said circumferential wall of said rotary door.

8. An air conditioner as set forth in claim 5, further comprising:

an air filter disposed at a position between said rotary door and said suction inlet within said inside air/outside air switching case.

* * * * *